(12) United States Patent
Park et al.

(10) Patent No.: US 9,007,987 B2
(45) Date of Patent: *Apr. 14, 2015

(54) METHOD FOR TRANSMITTING AN UPLINK SIGNAL AND FEEDBACK INFORMATION, AND REPLAY APPARATUS USING THE METHOD

(71) Applicant: LG Electronics Inc., Seoul (KR)

(72) Inventors: Kyu Jin Park, Anyang-si (KR); Han Gyu Cho, Anyang-si (KR); Yeong Hyeon Kwon, Anyang-si (KR); Jae Hoon Chung, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/296,182

(22) Filed: Jun. 4, 2014

(65) Prior Publication Data

US 2014/0286265 A1    Sep. 25, 2014

Related U.S. Application Data

(63) Continuation of application No. 13/147,770, filed as application No. PCT/KR2010/000876 on Feb. 11, 2010, now Pat. No. 8,774,081.

(60) Provisional application No. 61/151,827, filed on Feb. 11, 2009, provisional application No. 61/224,549, filed on Jul. 10, 2009.

(30) Foreign Application Priority Data

Feb. 11, 2010   (KR) .................. 10-2010-0012944

(51) Int. Cl.
*H04B 7/14*        (2006.01)
*H04J 1/14*        (2006.01)
(Continued)

(52) U.S. Cl.
CPC . *H04J 1/14* (2013.01); *H04B 7/155* (2013.01); *H04W 28/06* (2013.01); *H04W 72/042* (2013.01); *H04W 84/047* (2013.01); *H04B 7/15585* (2013.01); *H04B 7/2606* (2013.01)

(58) Field of Classification Search
None
See application file for complete search history.

(56) References Cited

U.S. PATENT DOCUMENTS 8,774,081 B2 *   7/2014   Park et al. .................. 370/315
2009/0135748 A1   5/2009   Lindoff et al.
(Continued)

FOREIGN PATENT DOCUMENTS

CN           101286780 A      10/2008
KR    10-2005-0100717 A      10/2005
(Continued)

OTHER PUBLICATIONS

Huawei, "Summary and proposal of relay frame structure," 3GPP TSG RAN WG1 Meeting #56, R1-090827, Feb. 9-13, 2009, pp. 1-6.
(Continued)

*Primary Examiner* — Brian Roberts
(74) *Attorney, Agent, or Firm* — Birch, Stewart, Kolasch & Birch, LLP

(57) ABSTRACT

The invention relates to a method of transmitting an uplink signal at a communication apparatus in a wireless communication system. The wireless communication system can receive pattern information of downlink subframes for a base station (BS)-to-the communication apparatus transmission as a bitmap; receive resource block (RB) information associated with a control channel for the BS-to-the communication apparatus transmission; receive the control channel from a fourth orthogonal frequency division multiplexing (OFDM) symbol of the downlink subframe n corresponding to a downlink subframe index n based on the RB information and the pattern information, the downlink subframe n comprising at least one downlink subframe other than downlink subframe 0, downlink subframe 4, downlink subframe 5 and downlink subframe 9; receive a data channel in the downlink subframe n; and transmit feedback information associated with the data channel to the BS via an uplink subframe for the communication apparatus-to-the BS transmission.

20 Claims, 5 Drawing Sheets

(51) Int. Cl.
  *H04B 7/155* (2006.01)
  *H04W 72/04* (2009.01)
  *H04B 7/26* (2006.01)
  *H04W 28/06* (2009.01)
  *H04W 84/04* (2009.01)

(56) References Cited

U.S. PATENT DOCUMENTS

| | | |
|---|---|---|
| 2010/0080166 A1 | 4/2010 | Palanki et al. |
| 2010/0097978 A1 | 4/2010 | Palanki et al. |
| 2010/0103860 A1 | 4/2010 | Kim et al. |
| 2010/0272006 A1 | 10/2010 | Bertrand et al. |
| 2011/0222428 A1 | 9/2011 | Charbit et al. |

FOREIGN PATENT DOCUMENTS

| | | |
|---|---|---|
| KR | 10-2005-0107220 A | 11/2005 |
| KR | 10-0787969 B1 | 12/2007 |

OTHER PUBLICATIONS

LG Electronics, "Consideration on Resource Allocation for Relay Backhaul Link," 3GPP TSG RAN WG1 Meeting #55bis, R1-090222, Jan. 12-16, 2009, 5 pages.

\* cited by examiner

METHOD FOR TRANSMITTING AN UPLINK SIGNAL AND FEEDBACK INFORMATION, AND REPLAY APPARATUS USING THE METHOD

CROSS-REFERENCE TO RELATED APPLICATIONS

This application is a continuation of co-pending U.S. patent application Ser. No. 13/147,770 filed on Aug. 3, 2011, which is the national Phase of PCT International Application No. PCT/KR2010/000876 filed on Feb. 11, 2010, which claims priority to U.S. Provisional Application Nos. 61/151, 827 filed on Feb. 11, 2009 and 61/224,549 filed on Jul. 10, 2009 and Application No. 10-2010-0012944 filed in the Republic of Korea on Feb. 11, 2010, the entire contents of all of the above applications are hereby incorporated by reference.

BACKGROUND OF THE INVENTION

1. Field of the Invention

The present invention relates to an uplink signal and feedback information transmitting method.

2. Discussion of the Related Art

In a link between a base station and a user equipment according to a related art, channel variation is serious due to mobility of the user equipment. Therefore, in case of downlink, a user equipment performs a channel measurement using a reference signal (RS) received from a base station and is then able to feed back a result of the channel measurement in form of a channel quality index (CQI), a precoding matrix index and the like. If so, the base station is able to perform a link adaptation for a downlink transmission to from the base station to the user equipment based on the feedback information. Since a channel status may vary seriously in accordance with time due to mobility of the user equipment, the user equipment is able to transmit CQI, PMI and the like by performing the channel measurements periodically.

In case of uplink, a base station is able to measure an uplink channel status based on a sounding reference signal (SRS) received from a user equipment. And, a link adaptation for an uplink transmission can be performed through this channel status measurement. For this, the base station is able to periodically allocate sounding reference signals to a plurality of user equipments.

In case that a channel status between a base station and a user equipment is poor, it is able to provide a radio channel having a better channel status to the user equipment by installing a relay node between the base station and the user equipment. If a relay node is introduced on a cell boundary area having a poor channel status from a base station, a faster data channel can be provided and a cell service area can be extended. Thus, the relay node is the technology introduced to get rid of a radio wave shade area in a wireless communication system and is being used widely. A recent relay node scheme continues to be developed into a further intelligent form, whereas a past relay node scheme if limited to a repeater function of amplifying and transmitting a signal simply. Moreover, the relay node technology corresponds to the technology mandatory for the service coverage extension and the data throughput improvement by reducing the cost for the base station establishment and the maintenance expense for a backhaul network in the next generation mobile communication system. In accordance with the ongoing development of the relay node technology, a new wireless communication system needs to support a relay node used by a related art wireless communication system.

In LTE-A system, a link between a base station and a relay node is able to use a backhaul link, while a link between a base station and a user equipment is able to use an access link. Since a relay node plays a role in relaying data, signals and the like received from a base station to a user equipment, a subordinate relay and the like, it can exist in a stationary form that barely has mobility. In case of considering a scenario for arranging a relay node existing in a stationary form, it can be said that a relay node almost has no variation of a channel status in accordance of elapse of time. In particular, the relay node is characterized in that a channel status for a specific frequency band is almost time-invariant.

A relay node, of which channel status is less variant in accordance with time on a specific frequency band, may not need to make a channel measurement report, i.e., a CQI/PMI (channel quality index/precoding matrix index) feedback, repeatedly with a predetermined cycle like the conventional user equipment and base station. This may cause a problem of increasing a resource overhead or a problem of degrading communication performance. Yet, any effort has not been made to research and develop a detailed method for a relay node to feed back a channel status to a base station until now.

A relay node plays a role in delivering data received from a base station to a user equipment within an area and also plays a role in delivering data received from a user equipment belonging to its area to a base station. Yet, since it is not preferable that the relay node receives data, signals and the like from the base station as soon as transmits data to the user equipments, a subframe capable of signal transmission and reception may be limited. Therefore, many efforts need to be made to research and develop a method of allocating backhaul subframes capable of communication between a base station and a relay node and a corresponding signaling method. When an allocation information on an uplink backhaul subframe and a corresponding signaling are not defined in a relay node, if the relay node receives data from a base station and a user equipment simultaneously, it causes a problem that error occurs in the data.

SUMMARY OF THE INVENTION

An object of the present invention is to provide a method of transmitting an uplink signal of a relay node.

Another object of the present invention is to provide a method of transmitting feedback information of a relay node.

Another object of the present invention is to provide a relay apparatus for transmitting an uplink signal.

A further object of the present invention is to provide a relay apparatus for transmitting feedback information.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To further achieve these and other advantages and in accordance with the purpose of the present invention, an uplink signal transmitting method of a relay node according to the present invention includes the steps of receiving a downlink (DL) backhaul subframe including a uplink (UL) grant information from a base station and transmitting a signal to the base station via a specific UL backhaul subframe based on the received UL grant information, wherein the UL grant information includes a timing indication information and wherein the timing indication information comprises an information about an interval from a DL backhaul subframe corresponding to the received UL grant information to the UL backhaul subframe transmittable in UL by the relay node.

To further achieve these and other advantages and in accordance with the purpose of the present invention, a method of transmitting an uplink signal in a relay node according to the present invention includes the steps of receiving a downlink (DL) backhaul subframe pattern information from a base station and transmitting the uplink signal to the base station via a uplink (UL) backhaul subframe based on an interval information indicating from a DL backhaul subframe to the UL, backhaul subframe, wherein the DL backhaul subframe pattern information includes an index information of the DL backhaul subframe and wherein the interval information comprises a predetermined value or is signaled from the base station.

To further achieve these and other advantages and in accordance with the purpose of the present invention, a method of transmitting feedback information at a relay node according to the present invention includes the steps of receiving a downlink (DL) reference signal from a base station, measuring a channel status using the received DL reference signal, and transmitting a differential value between the measured channel status value and a reference value, the measured channel status value when if the differential value is greater than a preset threshold value or a differential value between the measured channel status value and a last reported channel status value to the base station as the feedback information.

To further achieve these and other advantages and in accordance with the purpose of the present invention, a method of transmitting feedback information at a relay node according to the present invention includes the steps of receiving a downlink (DL) reference signal from a base station, measuring a channel status using the received DL reference signal, and if a differential value between the measured channel status value and a last reported channel status value is equal to or greater than a threshold value, transmitting the measured channel status value or the differential value as the feedback information to the base station.

To further achieve these and other advantages and in accordance with the purpose of the present invention, a relay node apparatus for transmitting an uplink signal according to the present invention includes a receiving unit for receiving a downlink (DL) backhaul subframe containing a uplink (UL) grant information from a base station and a transmitting unit for transmitting a signal to the base station via a specific UL backhaul subframe based on the received UL grant information, wherein the UL grant information includes a timing indication information and wherein the timing indication information comprises an information corresponding to an interval from a DL backhaul subframe corresponding to the received UL grant information to the UL backhaul subframe transmittable in UL by the relay apparatus.

To further achieve these and other advantages and in accordance with the purpose of the present invention, a relay apparatus for transmitting a feedback information according to the present invention includes a receiving unit for receiving a DL reference signal from a base station, a channel status measuring unit for measuring a channel status using the received DL reference signal, and a transmitting unit for transmitting a differential value between the measured channel status value and a reference value, the measured channel status value (if the differential value is greater than a preset threshold value) or a differential value between the measured channel status value and a last reported channel status value to the base station as the feedback information.

Accordingly, an uplink signal transmitting method of a relay node according to the present invention is able to efficiently transmit an uplink signal to a base station by keeping pace with a timing for an uplink backhaul subframe.

Moreover, a feedback information transmitting method of a relay node according to the present invention is able to considerably reduce a resource overhead due to frequent feedbacks and is also able to enhance communication performance of the relay node.

Effects obtainable from the present invention are non-limited the above mentioned effect. And, other unmentioned effects can be clearly understood from the following description by those having ordinary skill in the technical field to which the present invention pertains.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes 3GPP LTE ($3^{rd}$ generation partnership project long term evolution) system, they are applicable to other random mobile communication systems except unique features of 3GPP LTE.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. And, assume that that a base station is a common name of such a random node of a network stage communicating with a terminal as a node B, eNode B, a base station, an access point (AP) and the like. Moreover, a relay can be called a relay node (RN), a relay station (RS) or the like.

In a mobile communication system, a user equipment can receive information in downlink from a base station. The user equipment is also able to transmit information in uplink. The information transmitted/received by the user equipment includes data and various kinds of control information. And, various physical channels exist according to types and usages of the information transmitted or received by the user equipment.

Figure 1:
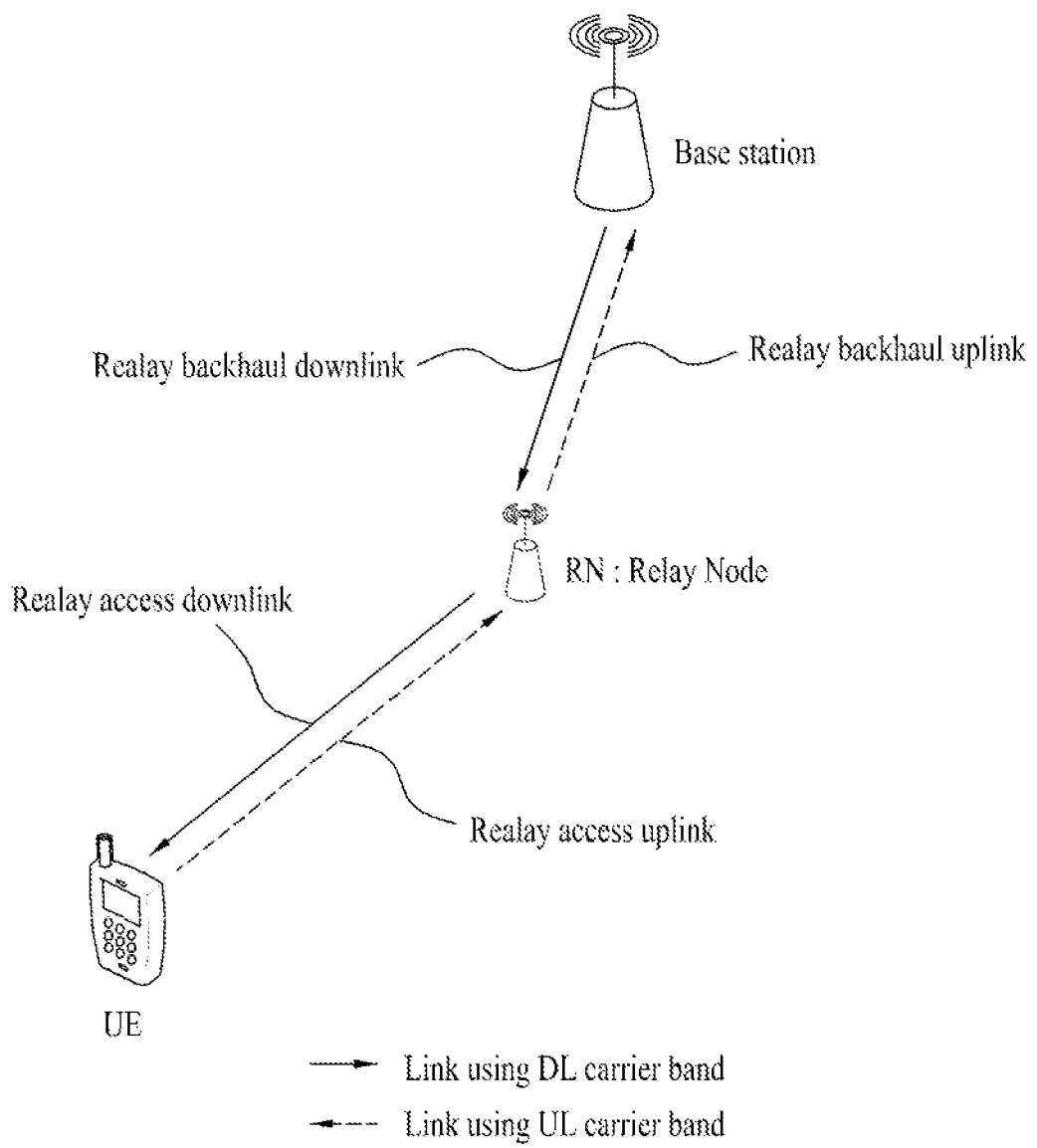
FIG. 1 is a diagram for a configuration of a relay backhaul link and a relay access link in a wireless communication system.

FIG. 1 is a diagram for a configuration of a relay backhaul link and a relay access link in a wireless communication system.

Referring to FIG. 1, a relay node (RN) is able to receive information from a base station in a relay backhaul downlink and is also able to transmit information to the base station in a relay backhaul uplink. Moreover, the relay node is able to transmit information to a user equipment in a relay access downlink and is also able to receive information from the user equipment in a relay access uplink.

The relay node is able to perform an initial cell search job such as a synchronization match with the base station and the like. For this, the relay node receives a synchronization channel from the base station, matches synchronization with the base station, and is able to obtain such information as cell ID and the like. Thereafter, the relay node receives a physical broadcast channel from the base station and is then able to obtain intra-cell broadcast information. Meanwhile, the relay node receives a downlink reference signal in the initial cell search step and is then able to check a channel status of the relay backhaul downlink. The relay node receives a physical downlink control channel (R-PDCCH: relay-physical downlink control channel) and a physical downlink control channel (R-PDSCH: relay-physical downlink control channel) in accordance with the physical downlink control channel information and is then able to obtain a detailed system information.

Meanwhile, if the base station is initially accessed or there is no radio resource for signal transmission, the relay node is able to perform a random access procedure on the base station. For this, the relay node transmits a specific sequence as a preamble on a physical random access channel (PRACH) or the like and is then able to receive a response message for the random access on a relay physical downlink control channel and a corresponding relay physical downlink shared channel. In case of a contention based random access except a case of handover, the relay node is then able to perform such a contention resolution procedure as a transmission of an additional physical random access channel and R-PDCCH/R-PDSCH reception.

Having performed the above-described procedures, the relay node is able to perform an R-PDCCH/R-PDSCH and R-PUSCH/R-PUCCH (relay-physical uplink shared channel/relay-physical uplink control channel) transmission as a general uplink/downlink signal transmission procedure. In this case, the control information, which is transmitted to the base station in uplink by the relay node or received by the base station from the relay node, can include a DL/UL (downlink/uplink) ACK/NACK signal, a channel quality information (channel quality indicator: CQI), a precoding matrix index (PMI), a rank indicator (RI) and the like. In case of the 3GPP LTE ($3^{rd}$ generation partnership long term evolution) system, the relay node is able to transmit such control information as CQI, PRI, RI and the like on R-PUSCH/R-PUCCH.

Figure 2:
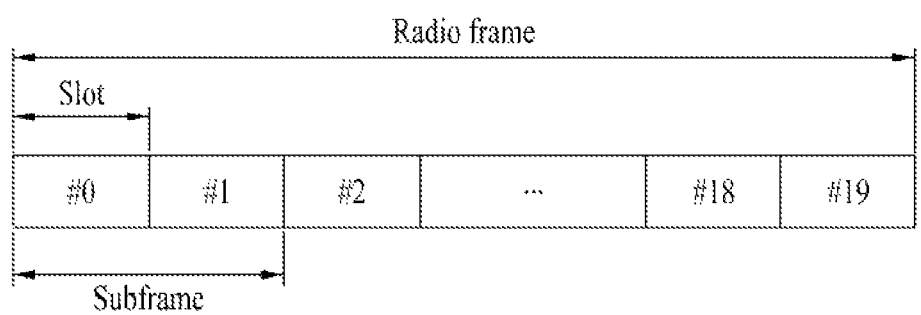
FIG. 2 is a schematic diagram of a frame structure in 3GPP LTE system for example of a mobile communication system.

FIG. 2 is a schematic diagram of a frame structure in 3GPP LTE system for example of a mobile communication system.

Referring to FIG. 2, a single radio frame can include 10 subframes. And, a single subframe is able to include 2 slots in time domain. A time taken to transmit a single subframe can be defined as a transmission time interval (TTI). For instance, a single subframe has a length of 1 ms and a single slot can have a length of 0.5 ms. Moreover, a single slot is able to include a plurality of OFDM (orthogonal frequency division multiplexing) symbols in time domain.

In 3GPP LTE system, OFDMA scheme is used in downlink and OFDM symbol is able to indicate a symbol cycle. And, the OFDM symbol can be regarded as one SC-FDMA symbol or one symbol cycle. A resource block (RB) is a resource allocation unit and is able to include a plurality of subcarriers adjacent to one slot. For instance, 10 subframes are included in a single radio frame, 2 slots are included in a single subframe, and 14 OFDM symbols are included in a single slot. Yet, each of the number of subframes, the number of slots and the number of OFDM symbols can be changed into one of various values.

In the following description, various methods of configuring uplink (hereinafter abbreviated UL) backhaul subframes, via which a base station will receive signals, data, information and the like from a relay node, are explained.

First of all, backhaul transmitting/receiving between a base station and a relay node can be possible only in a backhaul subframe allocated by a donor base station (or a donor eNB). The donor base station sets a pattern for the backhaul subframe by setting a cycle to one of 10 ms, 40 ms and the like and is then able to inform the relay node of the setting.

According to one embodiment of the present invention, when a base station configures an uplink backhaul subframe, the base station is able to allocate a downlink (hereinafter abbreviated DL) backhaul subframe. If so, the base station is able to allocate the UL backhaul subframe based on a pattern of the allocated DL backhaul subframe. For instance, a base station is able to allocate a subframe, which is spaced apart from a corresponding DL backhaul subframe number by a prescribed number (N) of subframe(s), as a UL backhaul subframe. In this case, the N can be implicitly fixed to a given DL subframe pattern. In particular, the value N is the predetermined value and a relay node may be already aware of the value N. Specifically, the value N can be set to one of 4, 5 and 6. For instance, assuming N=4, a base station is able to allocate a subframe, which is spaced apart from a corresponding DL backhaul subframe number by 4 subframes, as a UL backhaul subframe. Alternatively, a base station is able to explicitly signal a UL backhaul subframe to a relay node together with a DL backhaul subframe pattern. By such a method, the relay node can be aware of the subframe to which the UL backhaul subframe is allocated.

According to one embodiment of the present invention, when a base station configures an uplink backhaul subframe, the base station is able to set a DL backhaul subframe pattern to such a cycle as 10 ms, 40 ms and the like. And, the base station is able to set a UL backhaul subframe pattern to the same cycle of the DL subframe pattern.

For instance, in case that a base station sets a DL backhaul subframe pattern to a cycle of 10 ms, the base station is able to allocate 6 subframes (i.e., indexes 1, 2, 3, 6, 7 and 8) except the subframes of which subframe indexes are 0, 4, 5 and 9 to the DL backhaul subframes, respectively. In this case, it is able to allocate the DL backhaul subframes in a manner of explicitly signaling 6 bitmaps in bitmap format for the 6 subframes that can be allocated as the DL backhaul subframes.

Moreover, for the UL backhaul subframe allocation, the base station sets a UL backhaul subframe allocation pattern to a cycle of 10 ms or 40 ms in the same manner of the DL backhaul subframe and is then able to explicitly signal the allocation to a relay node. In doing so, the base station signals the UL backhaul subframe pattern in the bitmap format to the relay node using 10 or 40 bitmaps according to the pattern cycle of 10 ms or 40 ms. In particular, in case that the base station allocates the UL backhaul subframe pattern with the cycle of 10 ms, the base station is able to explicitly signal the UL backhaul subframe pattern as 10 bitmaps for 10 subframes set to the subframe indexes 0 to 9 to the relay node. By this method, the relay node can be aware of the subframe to which the UL backhaul subframe is allocated.

A base station is able to allocate a UL backhaul subframe by a grant based scheme.

According to one embodiment of the present invention, when a base station configures an uplink backhaul subframe, the base station is able to signal a UL backhaul subframe to a relay node via a UL grant of a DL backhaul subframe. The DL backhaul subframe including the UL grant can contain resource allocation information on the UL backhaul subframe indicated by the corresponding UL grant.

Information on a timing indication may be included in a UL grant field. And, the base station is able to transmit the UL grant including the timing indication information to the relay node. In this case, the timing indication information is situated within the UL grant field and is able to indicate a position at which the UL backhaul subframe is allocated. In particular, the timing indication information indicates that a UL backhaul subframe is allocated to a subframe spaced apart from DL backhaul subframes including the corresponding UL grant by a prescribed number (N) of subframes. In this case, the 'N' is a value in consideration of a processing time of a relay node, an ACK/NACK feedback timing for a DL backhaul transmission and the like. In accordance with the limitation put on the N value, the base station is able to determine the bit number to signal to N value to the relay node. In this case, the N value is not a fixed value but can vary dynamically. For instance, if N is a natural number on the condition of $4 \leq N \leq 6$, the base station is able to signal the N value using 2 bits. By this method, the relay node can be aware of the subframe to which the UL backhaul subframe is allocated.

In the following description, another application scheme of the scheme of enabling the timing indication information to be included in the UL grant information is explained. First of all, when a base station configures a UL backhaul subframe through an explicit signaling of the bitmap scheme, the scheme can be applied in a manner of indicating a UL backhaul subframe on which a resource allocation for a UL transmission is performed through a corresponding UL grant field among the set UL backhaul subframes.

For instance, for a specific relay node, a base station is able to allocate each DL subframe #1 (e.g., subframe index 1) in a cycle of a radio frame of 10 ms to a DL backhaul subframe through an explicit signaling for the DL backhaul subframe allocation. Independently, in case that each UL subframes #5, #6 and #8 (e.g., subframe indexes 6, 6 and 8) are allocated as UL backhaul subframes through an explicit signaling, the timing indication information can be included to indicate the UL backhaul subframe to which the UL grant information transmitted through the DL backhaul subframe 1 (e.g., subframe index 1).

In particular, if the N in the timing indication information indicates 4 (i.e., N=4), a corresponding UL grant indicates that a UL subframe having an index set to 5 is allocated as a UL backhaul subframe. If N=7, it is able to indicate that a UL subframe having an index set to 8 is allocated as a UL backhaul subframe.

Moreover, the N value of the corresponding timing indication information is able to indicate an interval (i.e., an index difference) between a UL subframe index for transmitting a UL grant and a UL subframe index for a corresponding UL transmission occurrence. Alternatively, the N value of the corresponding timing indication information can be defined as an interval added to a predefined reference value (e.g., a basic difference value between a UL grant and an uplink transmission in LTE system). As can be recognized from the example of the UL backhaul subframe allocation performed through the above-mentioned explicit signaling, the N value of the corresponding timing indication information is able to indicate a sequential indication value for each subframe allocated as a backhaul subframe among UL subframes next to 4 subframes, which correspond to a reference value with reference to a timing point of transmitting a UL grant in a DL backhaul subframe. In particular, according to the above example, a UL backhaul subframe #5 is indicated as a first UL backhaul subframe, a UL backhaul subframe #5 is indicated as a second UL backhaul subframe, a UL backhaul subframe #8 is indicated as a third UL backhaul subframe. This can be indicated by the timing indication information N.

In the following description, based on a reference signal received by a relay node from a base station through a DL backhaul subframe, a method of feeding back information on a channel status to the base station is explained.

First of all, a relay node is able to perform an initial channel measurement on a DL backhaul through a DL reference signal of a base station in an initial setting procedure. The relay not is able to transmit a result of the channel measurement in such a form as CQI, PMI and the like to the base station through a higher layer signaling. Such a channel measurement result report made by the relay node is periodic or aperiodic. A method for a relay node to report a channel measurement result to a base station periodically is explained as follows.

First of all, feedback information, e.g., a reference value for CQI can be set in advance. For instance, an initial CQI value of an initial setting of a relay node can be set as a reference value. And, a CQI report period is divided into a long-term period and a short-term period. If so, the relay node reports a differential value for a previously set reference value in a short-term period to the base station and is also able to report a real CQI value for updating a reference value to the base station in the long-term period. Optionally, the relay node is able to feed back the differential value for the reference value periodically. And, the relay node is able to report the actual CQI value to the base station to update the reference value only if the differential value for the reference value exceeds a prescribed threshold. Optionally, the relay node is able to feed back a differential value for a last reported CQI value to the base station. In order to prevent error propagation, the relay not is able to transmit a CQI feedback to the base station on a data channel. The base station is then able to feed back a corresponding ACK/NACK to the relay node.

In the following description, a method for a relay node to report a channel measurement report to a base station aperiodically is explained.

First of all, according to an event-triggering scheme, a relay node is able to feed back CQI to a base station only if a difference between a channel measurement result and a last fed-back CQI value is equal to or greater than a specific threshold. Each relay node is able to perform a channel measurement using such a reference signal as CRS/DRS of a DL backhaul subframe. As a result of the channel measurement, if the difference from a previous CQI value does not exceed a specific threshold, the relay node is able to omit the CQI feedback to the base station. On the contrary, if the difference from the previous CQI value exceeds the specific threshold, the relay node is able to transmit an updated CQI value in such a form as a message and the like to the base station. In this case, the updated CQI value includes a real measurement value or a differential value from a previous CQI value.

Having relieved the updated CQI value from the relay node, the base station is able to perform a link adaptation procedure on the relay node based on the updated CQI value until receiving a newly updated CQI value in the future.

Regarding the threshold value for updating the CQI value, each time the base station receives an updated CQI value, it informs the relay node of a newly updated threshold value in response to the received updated CQI value. Alternatively, the base station informs the relay node of a threshold value in response to an initial CQI report through an initial setting procedure of the relay not and keeps using the corresponding threshold value. Alternatively, only if an update is necessary, the base station is able to inform the relay node of an updated threshold value.

Figure 3:
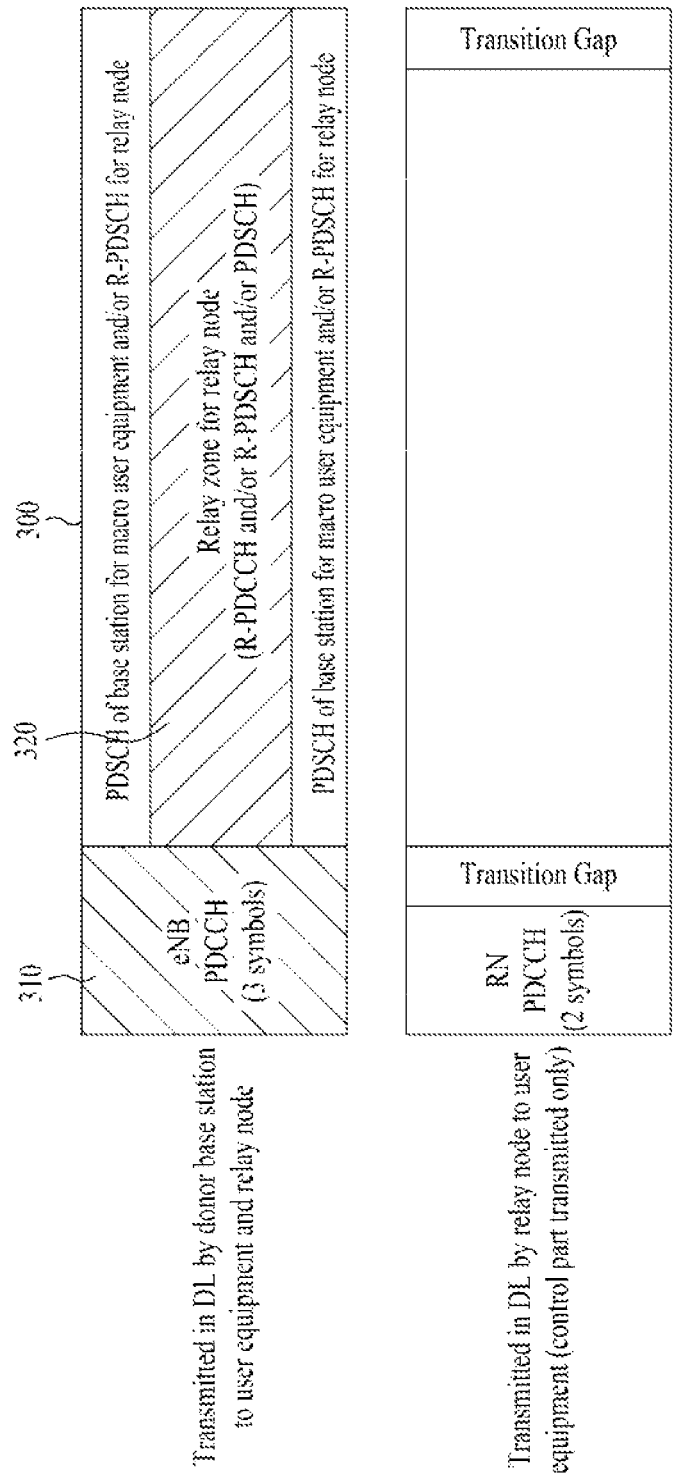
FIG. 3 is a diagram for one example of a frame structure used for a DL transmission by a base station and a relay node.

FIG. 3 is a diagram for one example of a frame structure used for a DL transmission by a base station and a relay node.

Referring to FIG. 3 (a), a donor base station is able to transmit control information to both a relay node and a user equipment on PDCCH (physical downlink control channel) 310. And, the base station is able to semi-statically allocate a physical resource block (PRB) for a transmission of R-PDCCH that is a PDCCH for the relay node, which can be named a relay zone 320. The relay node is able to receive the R-PDCCH through a blind search for the corresponding relay zone. In this case, the R-PDCCH is a kind of a control channel for the base station to transmit various kinds of control information to the relay node.

When the relay node feeds back a channel measurement result to the base station, it is able to send two types of the channel measurement result. According to a first type, the relay node is able to feed back CQI/PMI for a whole DL band in the same manner of a conventional wideband CQI/OMI feedback. On the other hand, according to a second type, the relay node is able to feed back CQI/PMI for a frequency band occupied by the PRBs semi-statically allocated for the R-PDCCH transmission, i.e., for a band occupied by the relay zone 320. In order for the relay node to perform the two kinds of the CQI/PMI feedbacks, the relay node needs to receive a signaling from the base station.

The base station is able to independently set a feedback timing and a cycle for each of the two types. For instance, the base station is able to alternately set a CQI feedback cycle of the first type and a CQI feedback cycle of the second type. The relay node transmits the first type CQI feedback or the second type CQI feedback by adding a 1-bit type indicator field, thereby enabling the base station to identify whether the relay node has transmitted the CQI feedback of the first type or the CQI feedback of the second type.

According to a CQU feedback method of another type, the relay node is able to make a CQI report by a subband unit. In this case, a size of a corresponding subband can be determined in consideration of a bandwidth of the relay zone 320 as well as the whole bandwidth. In particular, it is able to set a subband size to a divisor of the relay zone bandwidth.

Moreover, the relay node is able to feed back the CQI/PNI for the rest of the bands except the zone (i.e., a resource occupied by the PRB allocated for the R-PDCCH transmission), which becomes a CQI feedback target of the second type on the whole DL band, to the base station.

Figure 4:
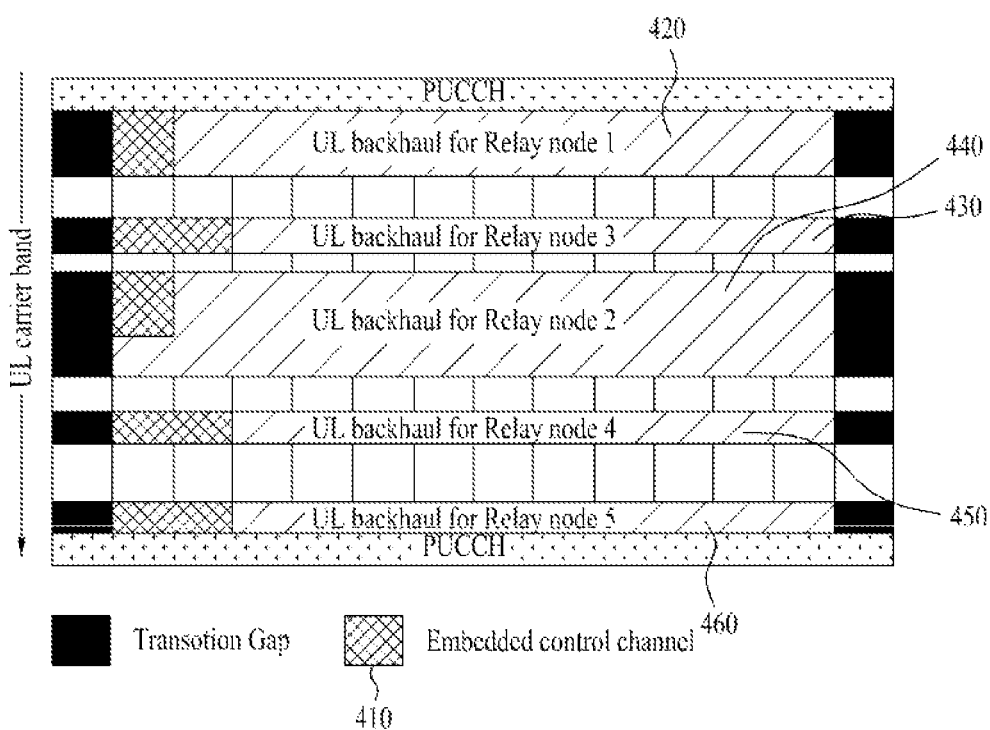
FIG. 4 is a diagram for one example of a frame structure used by a base station in a wireless communication system using a relay node.

FIG. 4 is a diagram for one example of a frame structure used by a base station in a wireless communication system using a relay node.

Referring to FIG. 4, each relay node is able to transmit UL control information to a base station using an embedded control channel 410 existing in a form embedded with a channel for transmitting UL backhaul data. In particular, an RN-specific (relay node-specific) control channel can be allocated. And, the relay nodes are able to transmit the UL backhaul data to the base station on RN-specific data channels 420, 430, 440, 450 and 460, respectively.

The relay node is able to transmit a UL ACK/NACK and a scheduling request (RS) from the base station for the DL backhaul transmission to the base station on a relay node control channel. Yet, the relay node is able to transmit CQI/PMI/RI feedback using a data channel. For a control signal transmitted on the data channel, the base station is able to feed back ACK/NACK to the relay node via PHICH (physical HARQ indicator channel). On the contrary, a UL control channel for a UL ACK/NACK and a scheduling request from the relay node can have a form of a common control channel of each relay node and can be allocated by FDM (frequency division multiplexing) with the data channel. The control channel of each relay node can have a modulation and coding scheme (MVS) different from that of the data channel.

Referring to FIG. 4, a relay node is able to transmit one ACK/NACK for a whole DL backhaul traffic via a relay node control channel. In case that the relay node individually transmits data to each user equipment, the relay node is able to transmit a plurality of ACK/NACK (i.e., ACK/NACK bundling) to a base station.

In case that a control channel for a relay node is not separately allocated, the relay node is able to transmit UL ACK/NACK to a base station using a sounding reference signal (SRS) for a DL transmission. For this, 2 sounding reference signals can be allocated to each relay node. In order to transmit ACK/NACK for a received DL backhaul subframe, the relay node selects a sequence corresponding to ACK or NACK in two sequences allocated via a sounding reference signal region of a UL backhaul subframe matching the DL backhaul subframe and is then able to transmit the selected sequence to the base station.

Figure 5:
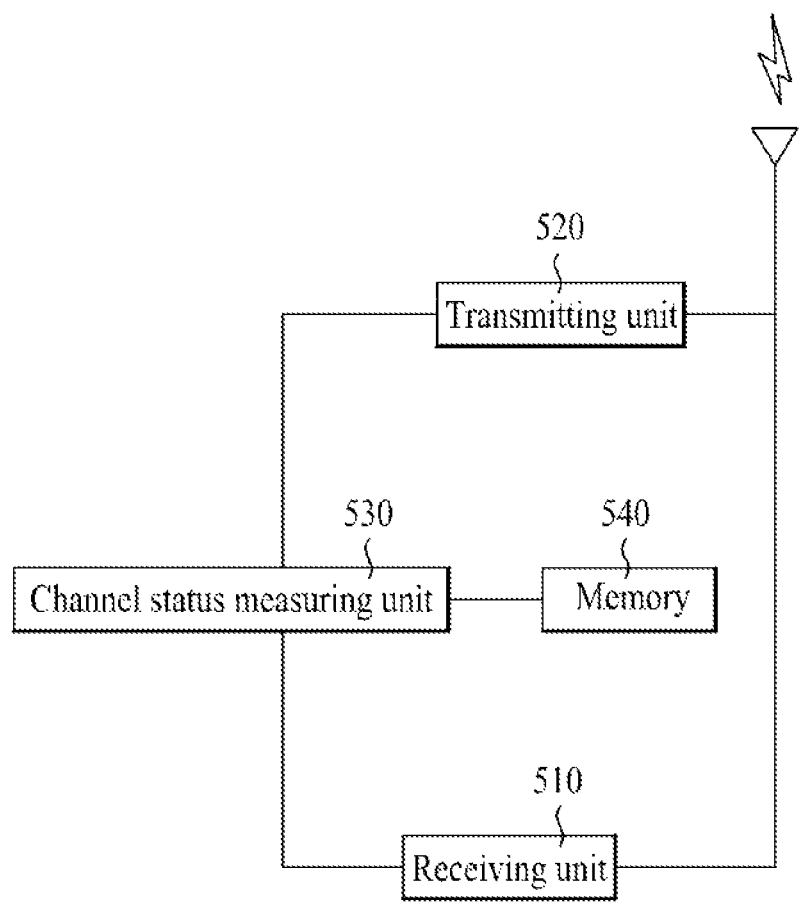
FIG. 5 is a diagram for a configuration of a relay node apparatus according to a preferred embodiment of the present invention.

FIG. 5 is a diagram for a configuration of a relay node apparatus according to a preferred embodiment of the present invention.

Referring to FIG. 5, a relay apparatus includes a receiving unit 510, a channel status measuring unit 520, a transmitting unit 530 and a memory 540.

The receiving unit 510 is able to receive various kinds of control information and data from a base station and is also able to receive signals, data and the like from a user equipment. The receiving unit 51 is able to receive a DL backhaul subframe containing UL grant information from the base station. The transmitting unit 530 is able to transmit a UL signal via a corresponding UL backhaul subframe based on the DL backhaul subframe received by the receiving unit 510, UL backhaul subframe configuration information and the like.

The channel status measuring unit 530 is able to measure a channel status using a DL reference signal of the base station received by the receiving unit 510. The transmitting unit 530 combines or generates the measured channel status value into various forms and is then able to transmit it to the base station. For instance, the transmitting unit 530 transmits a differential value between the measured channel status value and a reference value to the base station. If the differential value is greater than a preset threshold value, the transmitting unit 530 transmits the measured channel status value to the base station or is able to transmit a differential value between the measured channel status value and a last reported channel status value to the base station.

The memory 540 is able to store information processed by the relay apparatus for a prescribed period of time and can be replaced by such a component as a buffer (not shown in the drawing) and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope matching the principles and new features disclosed herein.

Accordingly, an uplink signal transmitting method of a relay apparatus and a feedback information transmitting method thereof according to the present invention is applicable to various wireless communication systems such as 3GPP LTE system and the like.

What is claimed is:

1. A method of transmitting an uplink signal at a communication apparatus in a wireless communication system, the method comprising:
   receiving pattern information of downlink subframes for a base station (BS)-to-the communication apparatus transmission as a bitmap;
   receiving resource block (RB) information associated with a control channel for the BS-to-the communication apparatus transmission;
   receiving the control channel from a fourth orthogonal frequency division multiplexing (OFDM) symbol of the downlink subframe n corresponding to a downlink subframe index n based on the RB information and the pattern information, the downlink subframe n comprising at least one downlink subframe other than downlink subframe 0, downlink subframe 4, downlink subframe 5 and downlink subframe 9;
   receiving a data channel in the downlink subframe n; and
   transmitting feedback information associated with the data channel to the BS via an uplink subframe for the communication apparatus-to-the BS transmission.

2. The method of claim 1, wherein the communication apparatus comprises a relay node and the control channel comprises a relay physical downlink control channel (R-PDCCH).

3. The method of claim 1, wherein the data channel comprises a physical downlink shared channel (PDSCH).

4. The method of claim 1, wherein the feedback information comprises an acknowledgement (ACK) signal or a negative acknowledgement (NACK) signal.

5. The method of claim 1, where the bitmap is represented as a 10 bits bitmap or a 40 bits bitmap.

6. The method of claim 1, wherein the uplink subframe for the communication apparatus-to-the BS transmission corresponds to an uplink subframe n+4 corresponding to a uplink subframe index n+4.

7. The method of claim 6, wherein the feedback information is transmitted via a physical uplink shared channel (PUSCH) of the uplink subframe n+4.

8. A communication apparatus for transmitting an uplink signal in a wireless communication system, the communication apparatus comprising:
   a receiving unit configured to:
      receive pattern information of downlink subframes for a base station (BS)-to-the communication apparatus transmission as a bitmap,
      receive resource block (RB) information associated with a control channel for the BS-to-the communication apparatus transmission,
      receive the control channel from a fourth orthogonal frequency division multiplexing (OFDM) symbol of the downlink subframe n corresponding to a downlink subframe index a based on the RB information and the pattern information, the downlink subframe n comprising at least one downlink subframe other than downlink subframe 0, downlink subframe 4, downlink subframe 5 and downlink subframe 9, and
      receive a data channel in the downlink subframe n; and
   a transmitting unit configured to transmit feedback information associated with the data channel to the BS via an uplink subframe for the communication apparatus-to-the BS transmission,
   wherein the uplink subframe for the communication apparatus-to-the BS transmission corresponds to an uplink subframe n+4 corresponding to a uplink subframe index n+4.

9. The communication apparatus of claim 8, wherein the communication apparatus comprises a relay node and the control channel comprises a relay physical downlink control channel (R-PDCCH).

10. The communication apparatus of claim 8, wherein the data channel comprises a physical downlink shared channel (PDSCH).

11. The communication apparatus of claim 8, wherein the feedback information comprises an acknowledgement (ACK) signal or a negative acknowledgement (NACK) signal.

12. A method of receiving an uplink signal at a base station (BS) in a wireless communication system, the method comprising:
   transmitting pattern information of downlink subframes for the BS-to-a communication apparatus transmission as a bitmap;
   transmitting resource block (RB) information associated with a control channel for the BS-to-the communication apparatus transmission;
   transmitting the control channel from a fourth orthogonal frequency division multiplexing (OFDM) symbol of the downlink subframe n corresponding to a downlink subframe index n based on the RB information and the pattern information, the downlink subframe n comprising at least one downlink subframe other than downlink subframe 0, downlink subframe 4, downlink subframe 5 and downlink subframe 9;
   transmitting a data channel in the downlink subframe n; and
   receiving feedback information associated with the data channel from the communication apparatus via an uplink subframe for the communication apparatus-to-the BS transmission.

13. The method of claim 12, wherein the communication apparatus comprises a relay node and the control channel comprises a relay physical downlink control channel (R-PD-CCH).

14. The method of claim 12, wherein the data channel comprises a physical downlink shared channel (PDSCH).

15. The method of claim 12, wherein the feedback information comprises an acknowledgement (ACK) signal or a negative acknowledgement (NACK) signal.

16. The method of claim 12, wherein the uplink subframe for the communication apparatus-to-the BS transmission corresponds to an uplink subframe n+4 corresponding to a uplink subframe index n+4.

17. The method of claim 16, wherein the feedback information is received via a physical uplink shared channel (PUSCH) of the uplink subframe n+4.

18. A base station (BS) for receiving an uplink signal in a wireless communication system, the BS comprising:
a transmitting unit configured to:
transmit pattern information of downlink subframes for the BS-to-a communication apparatus transmission as a bitmap,
transmit resource block (RB) information associated with a control channel for the BS-to-the communication apparatus transmission,
transmit the control channel from a fourth orthogonal frequency division multiplexing (OFDM) symbol of the downlink subframe n corresponding to a downlink subframe index n based on the RB information and the pattern information, the downlink subframe n comprising at least one downlink subframe other than downlink subframe 0, downlink subframe 4, downlink subframe 5 and downlink subframe 9, and
transmit a data channel in the downlink subframe n; and
a receiving unit configured to receive feedback information associated with the data channel from the communication apparatus via an uplink subframe for the communication apparatus-to-the BS transmission,
wherein the uplink subframe for the communication apparatus-to-the BS transmission corresponds to an uplink subframe n+4 corresponding to a uplink subframe index n+4.

19. The BS of claim 18, wherein the communication apparatus comprises a relay node and the control channel comprises a relay physical downlink control channel (R-PD-CCH).

20. The BS of claim 18, wherein the uplink subframe for the communication apparatus-to-the BS transmission corresponds to an uplink subframe n+4 corresponding to a uplink subframe index n+4.

* * * * *

UNITED STATES PATENT AND TRADEMARK OFFICE
CERTIFICATE OF CORRECTION

| | | |
|---|---|---|
| PATENT NO. | : 9,007,987 B2 | Page 1 of 1 |
| APPLICATION NO. | : 14/296182 | |
| DATED | : April 14, 2015 | |
| INVENTOR(S) | : Kyu Jin Park et al. | |

It is certified that error appears in the above-identified patent and that said Letters Patent is hereby corrected as shown below:

ON THE TITLE PAGE and IN THE SPECIFICATION:

At item (54) and at column 1, lines 1-4, correct the Title of the Invention to read as follows: --METHOD FOR TRANSMITTING AN UPLINK SIGNAL AND FEEDBACK INFORMATION, AND RELAY APPARATUS USING THE METHOD--.

Signed and Sealed this
Fifteenth Day of September, 2015

Michelle K. Lee
*Director of the United States Patent and Trademark Office*